(12) United States Patent
Willets et al.

(10) Patent No.: US 7,615,889 B2
(45) Date of Patent: Nov. 10, 2009

(54) MODULAR CELL SITE

(75) Inventors: Julie A. Willets, Overland Park, KS (US); Jerry D. Meyers, Olathe, KS (US); Larry L. Johnson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 546 days.

(21) Appl. No.: 11/120,053

(22) Filed: May 2, 2005

(65) Prior Publication Data

US 2006/0246328 A1 Nov. 2, 2006

(51) Int. Cl.
*H02J 7/00* (2006.01)

(52) U.S. Cl. .......................................... 307/66

(58) Field of Classification Search ............ 307/45, 307/66; 290/1 A; 361/602, 728; 429/12
See application file for complete search history.

(56) References Cited

U.S. PATENT DOCUMENTS

| | | | |
|---|---|---|---|
| 4,119,861 A | 10/1978 | Gocho | |
| 4,283,634 A | 8/1981 | Yannone et al. | |
| 4,598,542 A | 7/1986 | Reynolds | |
| 4,636,173 A | 1/1987 | Mossman | |
| 5,737,202 A | 4/1998 | Shimamori | |
| 5,767,637 A | 6/1998 | Lansberry | |
| 6,011,324 A | 1/2000 | Kohlstruck et al. | |
| 6,184,593 B1 | 2/2001 | Jungreis | |
| 6,380,637 B1 | 4/2002 | Hsu et al. | |
| 6,452,289 B1 | 9/2002 | Lansberry et al. | |
| 6,498,462 B2 | 12/2002 | Ballantine et al. | |
| 6,522,955 B1 | 2/2003 | Colborn | |
| 6,649,289 B2 | 11/2003 | Hsu et al. | |
| 6,670,721 B2 | 12/2003 | Lof et al. | |
| 6,703,722 B2 | 3/2004 | Christensen | |
| 6,787,259 B2 * | 9/2004 | Colborn et al. | 429/23 |
| 6,879,052 B1 * | 4/2005 | Johnson | 290/1 A |
| 6,885,112 B2 * | 4/2005 | Johnson | 290/1 A |
| 6,930,402 B1 * | 8/2005 | Johnson et al. | 290/1 R |
| 6,960,838 B2 * | 11/2005 | Johnson | 290/1 A |
| 6,992,401 B1 * | 1/2006 | Johnson | 290/1 A |
| 7,081,687 B2 * | 7/2006 | Johnson | 290/1 A |
| 7,098,548 B2 * | 8/2006 | Johnson | 290/1 A |
| 7,112,891 B2 * | 9/2006 | Johnson et al. | 290/1 A |
| 7,157,803 B2 * | 1/2007 | Meyers et al. | 290/1 A |

(Continued)

FOREIGN PATENT DOCUMENTS

EP 0 595 191 A 5/1994

(Continued)

OTHER PUBLICATIONS

Kato et al., "1-kW Portable Fuell Cell System Based on PEFCs", May 2000, IEEE Cat. No. 00EX424, 2000 p. 209-13.*

(Continued)

*Primary Examiner*—Albert W Paladini
*Assistant Examiner*—Daniel Cavallari

(57) ABSTRACT

The present invention is a modular power system using a fuel cell as a back-up power supply. The system includes lithium-metal-polymer (LMP) batteries to bridge and also for backup power if necessary. The entire system is preassembled ready for use so that it is available to a new or expanding site upon delivery. The total number of modular units used can simply be aggregated to meet additional power demanded.

14 Claims, 4 Drawing Sheets

U.S. PATENT DOCUMENTS

| | | | |
|---|---|---|---|
| 7,240,492 B2 * | 7/2007 | Johnson | 60/649 |
| 7,242,104 B1 * | 7/2007 | Johnson | 290/1 A |
| 7,245,032 B2 * | 7/2007 | Willets et al. | 290/1 A |
| 7,245,034 B2 * | 7/2007 | Johnson | 290/1 A |
| 7,256,506 B2 * | 8/2007 | Johnson | 290/1 A |
| 2001/0009338 A1 | 7/2001 | Reutere | |
| 2004/0126635 A1 * | 7/2004 | Pearson | 429/23 |
| 2005/0181244 A1 * | 8/2005 | Porter et al. | 429/12 |
| 2005/0181783 A1 * | 8/2005 | Foosaner et al. | 455/424 |
| 2006/0016189 A1 * | 1/2006 | Johnson | 60/651 |
| 2006/0038403 A1 * | 2/2006 | Johnson et al. | |
| 2006/0038533 A1 * | 2/2006 | Johnson et al. | |
| 2006/0049637 A1 * | 3/2006 | Johnson et al. | |
| 2006/0066105 A1 * | 3/2006 | Johnson et al. | 290/1 A |
| 2006/0066108 A1 * | 3/2006 | Willets et al. | 290/10 |
| 2006/0071476 A1 * | 4/2006 | Johnson | 290/1 A |
| 2006/0076780 A1 * | 4/2006 | Johnson | 290/1 A |
| 2006/0076831 A1 * | 4/2006 | Meyers et al. | 307/10.1 |
| 2006/0158037 A1 * | 7/2006 | Danley et al. | 307/64 |
| 2006/0244268 A1 * | 11/2006 | Meyers et al. | 290/54 |
| 2006/0246328 A1 * | 11/2006 | Willets et al. | 429/17 |
| 2006/0263656 A1 * | 11/2006 | Johnson et al. | |
| 2006/0286416 A1 * | 12/2006 | Willets et al. | 429/17 |
| 2007/0002547 A1 * | 1/2007 | Garmong | 361/752 |
| 2007/0057510 A1 * | 3/2007 | Meyers et al. | 290/1 A |
| 2007/0152506 A1 * | 7/2007 | Meyers et al. | |
| 2007/0200435 A1 * | 8/2007 | Willets et al. | 307/66 |
| 2007/0200533 A1 * | 8/2007 | Willets et al. | 322/1 |
| 2007/0234975 A1 * | 10/2007 | Willets et al. | 123/1 A |
| 2008/0115496 A1 * | 5/2008 | Willets et al. | 60/734 |
| 2008/0115505 A1 * | 5/2008 | Willets et al. | 60/790 |
| 2008/0203821 A1 * | 8/2008 | Johnson et al. | |
| 2008/0203822 A1 * | 8/2008 | Johnson et al. | |

FOREIGN PATENT DOCUMENTS

| | | |
|---|---|---|
| WO | WO 99/32762 | 7/1999 |

OTHER PUBLICATIONS

"A High-Availability Backup Source of Energy", J. C. Chigolet et al. dated Sep. 27, 1993.

Yutaka, Kuwata, "Multifuel Fuel-Cell Energy System for Telecommunications Cogeneration System," Ieice Trans. Commun., Vol. E1 B., No. 11, Nov. 1998.

"Advances promise high cycle life, commercial viability for electric vehicles," Dept. of Energy, U.S.A., Apr. 2001.

* cited by examiner

MODULAR CELL SITE

CROSS-REFERENCE TO RELATED APPLICATIONS

None.

STATEMENT REGARDING FEDERALLY SPONSORED RESEARCH OR DEVELOPMENT

None.

FIELD OF THE INVENTION

In general, this invention relates to the field of providing BTS and power equipment for use with a cell tower. More specifically, this invention relates to power-system-housing arrangements, installations, and power-backup systems.

BACKGROUND OF THE INVENTION

Traditionally, cell sites are constructed using commercial power from a utility as the primary source of electrical power. Telecommunications power systems include backup power arrangements to ensure continued power in the event blackouts and other disturbances in the commercial power grid. To accomplish this, many facilities use a diesel generator. The diesel generator is then backed up by an array of valve-regulated lead-acid (VRLA) batteries. The combined arrangement—the AC electrical utility receiving equipment, diesel generator, and VRLA batteries—are all separately installed at a site. This takes up a considerable amount of space.

These conventional systems can be time consuming to install as each component must be engineered and installed separately. This is because each site has its own restrictions so the layout generally has to be tailored to the individual site, driving up engineering and installation costs.

Further, when a site's BTS and power requirements increase over time, the engineering decisions become complex. For example, the engineer must decide whether to augment or replace the existing equipment. Finding equipment to complement the existing equipment is difficult, due to space limitations and lease agreements with the land owners.

SUMMARY OF THE INVENTION

The present invention comprises a modular power system which overcomes the disadvantages in the prior art systems. This is accomplished using a cabinet that is configured to include the base transceiver station (BTS), surge-protection equipment, rectification circuitry, a fuel cell, hydrogen gas tanks, and an energy-storage device. The arrangement is modular, and is able to be delivered to a site ready for installation and operation.

The modular power supply operates according to a contingency plan which ensures constant DC power to the site. The primary source of power for the facility comes from the commercial AC power grid. In the event of a commercial AC power failure, the energy-storage device provides uninterruptible power until the fuel cell becomes operational. The fuel cell then receives and consumes hydrogen gas to produce backup power for the BTS. If the fuel cell fails, the energy-storage device operates in a backup capacity to maintain power until some other source becomes available.

BRIEF DESCRIPTION OF THE DRAWINGS

The present invention is described in detail below with reference to the attached drawing figures, wherein.

DETAILED DESCRIPTION OF THE INVENTION

The present invention has numerous advantages over the conventional power-system housing arrangements, system installations, back-up arrangements.

For example, the disclosed embodiment takes up much less space. One module of the present invention takes up only about a 3' by 11' pad (33 ft$^2$), whereas a comparable conventional BTS/VRLA arrangement would require a floor area of about 12' by 18' (or 216 ft$^2$)—six times the space. If a generator is installed at the site, even more space would be required.

Also a consideration is the modular aspect of the present invention. Unlike conventional systems which are engineered for the specific requirements of a new site, or re-engineered to meet increased BTS and power requirements in expanding a site, the new modular system comes to the site ready for use. Each module comes already assembled. When additional BTS and power requirements are necessary at a new or expanding site, a module is transported to, and then incorporated into the already-existing system at the facility. Once hooked up, it is ready for service.

Figure 1:
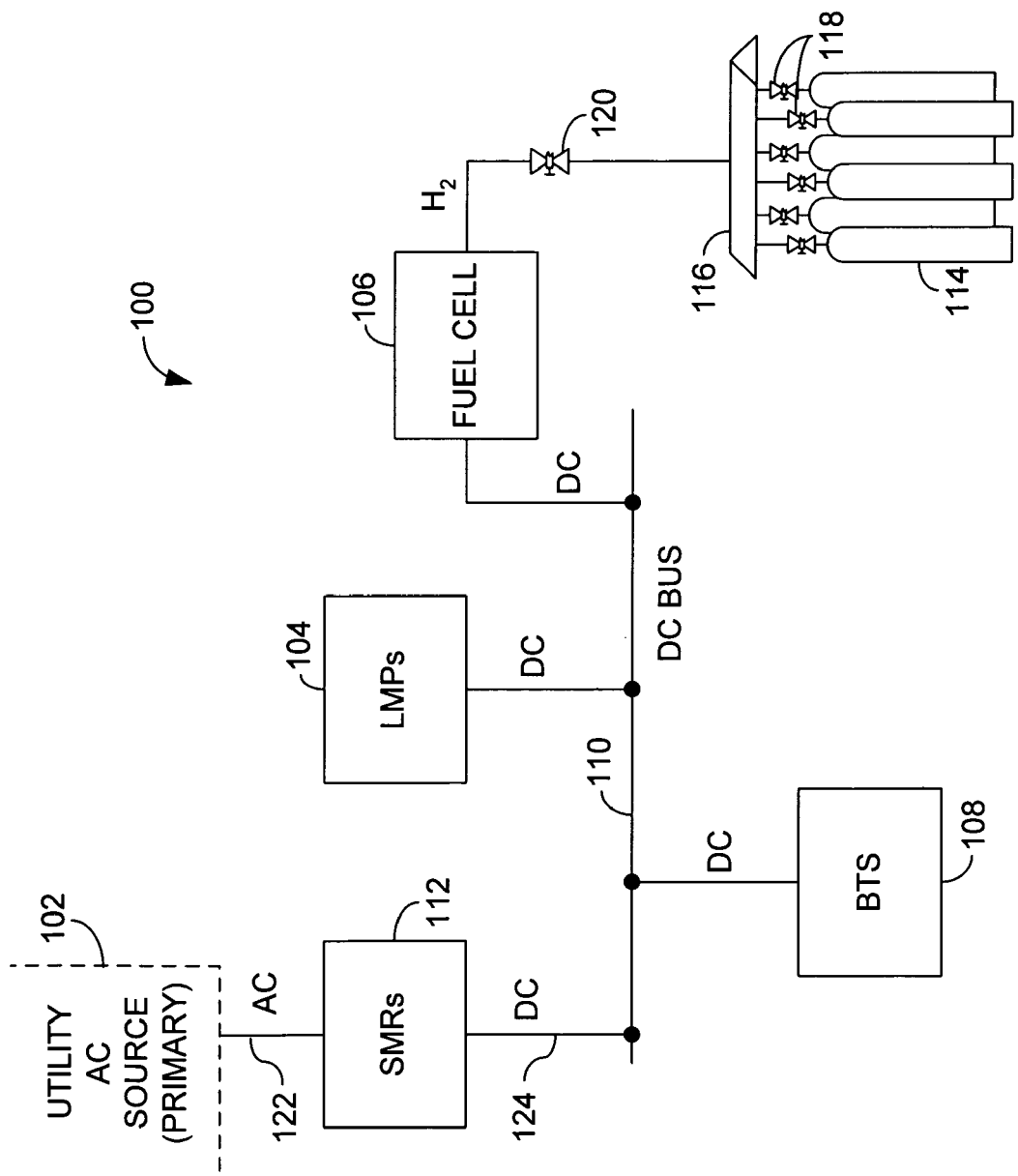
FIG. 1 is a schematic showing how the components of the present invention are functionally interconnected and thus operate together.

The drawings of FIGS. 1-5 help in understanding the disclosed embodiment. Referring first to FIG. 1, the figure shows a novel power system in which the present invention, in one embodiment, may be employed.

Looking first to FIG. 1, we see a schematic representation 100 of the system components. Each module is adapted to consume AC from a utility AC source 102. The system also includes a DC power storage device 104. In the preferred embodiment, storage device 104 is a lithium battery. The system also includes an energy-conversion device 106. In the preferred embodiment, energy-conversion device 106 is a fuel cell.

All three of these potential energy sources 102, 104, and 106 are used to ensure that DC power is maintained to the power-distribution unit (not shown) for the BTS 108. The BTS is the radio-hardware portion of a cellular base station. It is involved in the transmission and receiving of voice and data. Power distribution units comprise the electrical equipment for making the necessary connections into the telecommunication-cell-site equipment. In the present embodiment, the BTS equipment is housed in a cabinet.

It should be understood that it is very important that power is not lost to the BTS—even temporarily. Failures could irrevocably damage customer relations. Customers are becoming increasingly dependent on telecommunications systems to handle important matters, e.g., financial transactions. The system and processes here dramatically reduce the possibilities for failure.

This objective is accomplished by providing a backup system for BTS 108 in case the utility AC source 102 goes down. For example, the system must be prepared to successfully encounter blackouts, rolling power losses, and other possible problems with utility source 102.

BTS 108 consumes DC, not AC. Thus, the AC received from source 102 must be converted. To do this, system 100 includes multiple rectifiers 112. Rectifiers convert AC to DC. The particular rectifiers used in the present invention are switch mode rectifiers (SMRs). SMRs are advantageous for use here because they are highly efficient, have small size, and are relatively light weight.

The DC output from the rectifiers 112 is connected to a DC bus 110. The DC input to BTS 108 are also connected to this bus. Thus, BTS 108 is able to receive its primary source of power from AC utility 102.

If the AC goes out, the energy-storage devices 104 will immediately pick up the load temporarily in a bridging capacity. In the preferred embodiment, these energy-storage devices 104 are lithium batteries. More specifically, lithium-metal-polymer batteries ("LMPs"). The LMPs have an anode made of lithium and an organic electrolyte with no water. Though LMPs have been used in the preferred embodiment, other energy storage devices, and other kinds of lithium-batteries might be used as well and still fall within the scope of the present invention. Lithium-ion batteries are comprised of a carbon anode, a metal oxide cathode, and an electrolyte which is a lithium salt in an organic solvent. Other kinds of batteries, e.g., nickel-cadmium might work as well and would also fall within the scope of some embodiments of the present invention.

LMP batteries provide several key advantages over other battery architectures such as valve-regulated lead-acid (VRLA), gell cells, and other known battery sources, in that they operate in high or low ambient temperatures (−40° F. to +149° F.) without the need for external heating or cooling requirements. A battery capable of withstanding extreme temperatures is advantageous for a communications provider in industrial applications. One reason for this is that in most wireless telecommunication networks, a base transceiver station (BTS) is located at or near an outdoor communications tower. Because of this, it is important that the modular unit be able to endure a wide range of weather and temperature changes.

Further, LMP batteries may be used by a provider in an enclosure having no air-conditioning. They are also smaller than conventional batteries. These factors result in saved space and costs.

Another advantage of using LMP batteries within a communications network is that they are environmentally friendly and noncorrosive. This allows a provider to house the batteries in cabinets or other enclosures without venting. Venting is unnecessary because the LMP batteries do not emit gases (hydrogen and other toxins) that are harmful to breathe or flammable.

Another benefit of LMP batteries is that they exhibit a long life span (greater than 10 years) and a slow-linear aging characteristic. This provides the communication provider with greater reliability, and enables them to accurately predictable battery replacement intervals.

Additionally, LMP batteries may be disconnected and put into sleep mode. Sleep mode is a state in which the LMP is temporarily taken off line until it is later called back into duty. This avoids drain which would otherwise require periodic recharging.

Another distinct advantage of the LMP battery is the ability to locally or remotely monitor the battery status either from an LED source located on the battery, or via a link-cable connected to the provider's computer, communications network, or alarm system. Determining when a battery is nonfunctional is a time-saving tool for providers and technicians performing preventive maintenance measures. A visible LED source located on the battery provides an easily viewed indication of the batteries state of health. Furthermore, in the preferred embodiment, these batteries are smart devices, which enables them to notify a systems administrator over a computer network of failures.

The LMP battery used in the preferred embodiment of the invention is a 48-volt, 63 amp-hour battery manufactured by Avestor, Inc. (Model No. SE 48S63), but the scope of the invention is not to be limited to any particular manufacturer or amp-hour/voltage level used. Three batteries are used in the present embodiment (see FIG. 3).

With respect to its bridging functions, the LMP batteries 104 provide electrical power during the time it takes to switch from the AC utility 102 as a source to the hydrogen powered fuel cell 106. In order to accomplish this, each LMP battery 104 is electrically linked to bus 110 in parallel with the fuel cell 106 output and the and rectifier array 112 output. Bus 110 then makes the electrical connection into the power distribution equipment in BTS 108.

Fuel cells are electrochemical-energy-conversion devices. They utilize hydrogen and oxygen. Proton exchange membranes (or other equivalent devices) in the fuel cell cause the electron from hydrogen to be removed temporarily. Later, this hydrogen electron is returned when the hydrogen is combined with the oxygen to produce water. This creates electricity. The reaction is entirely noncombustive and generates DC electrical power. Because the only by-products of this reaction are heat, water, and electricity, a fuel cell is friendly to the environment. In addition, a fuel cell is capable of providing electrical power for as long as hydrogen fuel is supplied to the unit. It does not discharge over time like a battery.

In the preferred embodiment disclosed in FIG. 1, fuel cell 106 includes at least one proton-exchange-membrane (PEM). Most fuel cells include a plurality of PEMs. Though fuel cell 106 used in the preferred embodiment uses PEMs, other fuel-cell technologies exist which might be used instead and still fall within the scope of the present invention. One example of a PEM-type fuel cell which is suitable for use with the present invention is the modular, cartridge-based, proton exchange membrane I-1000 power module manufactured by Reli-On, Inc. of Spokane, Wash. This particular fuel cell comprises three modules (as will be seen in FIG. 3)

In the FIG. 1 arrangement, fuel cell 106 receives hydrogen fuel via tubing from a plurality of pressurized hydrogen tanks 114. Six tanks 114 exist in the disclosed embodiment.

The rate of hydrogen flow is controlled using automated valve 120. One valve heads each of the tanks 114 and enable hydrogen to be stored and then released when needed.

If the stored hydrogen is released from the tanks, it is consumed by the fuel cell 106. When this happens, a DC power output is produced and is fed into DC bus 110. This arrangement makes the fuel-cell-produced DC power available to BTS 108.

If fuel cell 106 fails, or runs out of fuel, the energy-storage devices (LMPs) 104 are then used as a backup power source. Thus, they must be selected to have sufficient amp hour ratings to meet backup requirements.

Though not shown, the power system of the present invention also comprises a control system which includes a number of sensing and control mechanisms (not shown) for determining which fuel source to activate and which power source to engage. As will be known to one skilled in the art, these kinds of automated systems may be separate devices, or may be integral to the valves, bus lines, and/or devices being monitored. Likewise, the control mechanisms may be separate devices, such as programmable logic controllers, or may be integrated into the components already described. Regardless, this kind of monitoring and activating equipment will be known to one skilled in the art, and one skilled in the art will know how to arrange these devices such that (i) a power drop in the utility AC source 102 will be detected; (ii) fuel cell 106 can be activated when needed because of a detected drop in utility AC; (iii) automated valve 120 can be opened and closed to supply fuel cell 106; and (iv) other automated requirements are met. Particular arrangements for accomplishing these objectives will be evident to and fall within the abilities of one skilled in the art.

Figure 2:
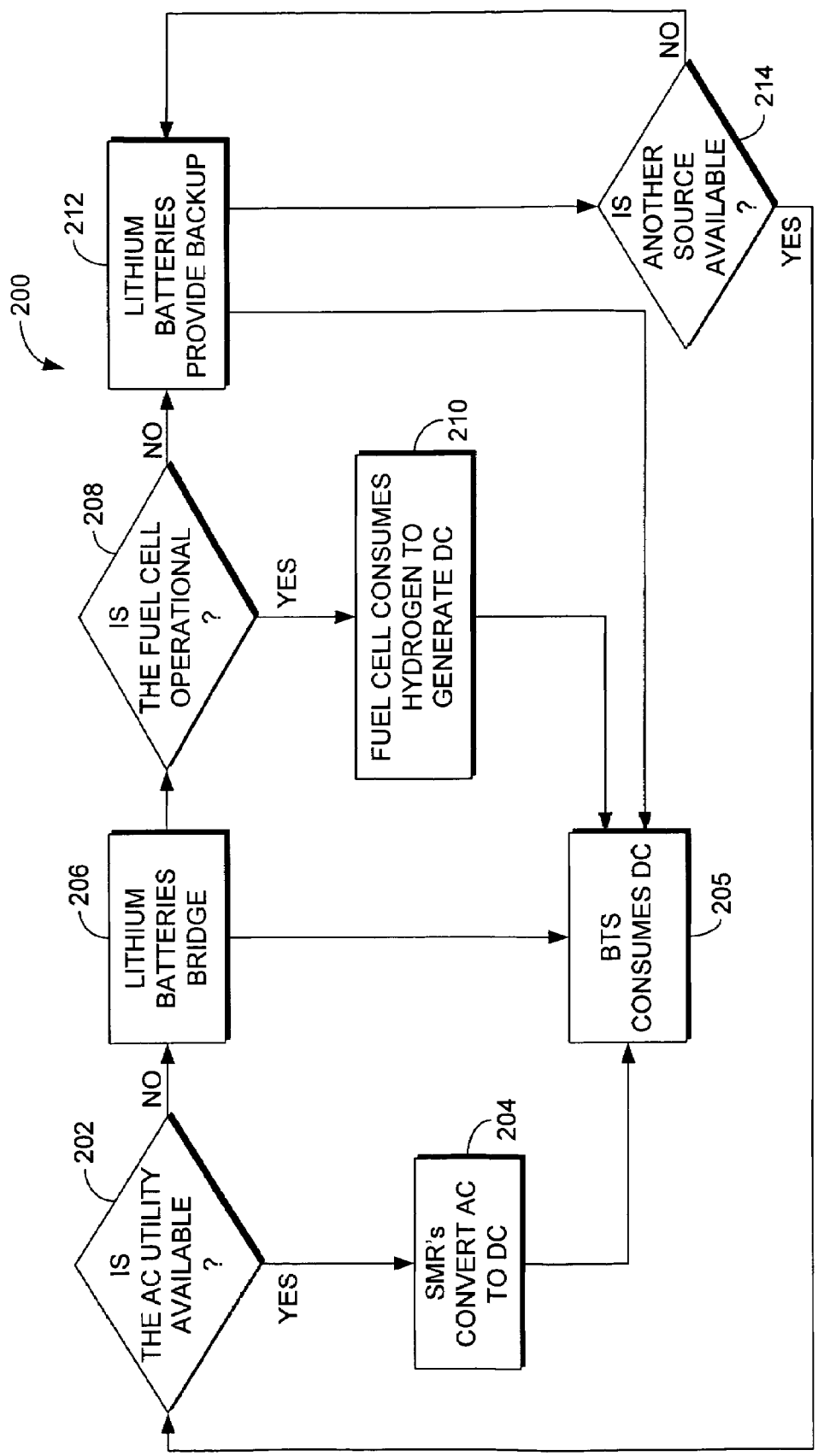
FIG. 2 is a front view of the physical embodiment of the housing of the invention shown including some of the equipment utilized.

A power-management flow chart 200 of FIG. 2 shows both the operational aspects of system 100 as well as different contingency plans in the event that the AC utility 102 fails. In a first step 202 of the process, an inquiry is made as to whether AC utility 102 is available as the primary energy source. The typical answer to this question will be yes. One way this may be determined is by the monitoring of AC 122 for current. Normally current will be detected and the process will move on to a step 204. In step 204, conversion devices, e.g., rectifiers 112, will convert the AC from utility 102 into DC, which is introduced into bus 110 for consumption by BTS 108 in step 205. This is the normal mode of operation.

If, however, no AC is available from utility 102 because, e.g., the power grid is down, no current will be detected in lines 122. When this happens, the "no" prong for the query in step 202 directs the process to a step 206. In step 206, the lithium batteries 104 will temporarily bridge so that constant power is maintained to the BTS until fuel cell 106 comes on line. This usually takes about 14 seconds. The lithium batteries are able to meet this requirement easily.

In a step 208 a determination is made as to whether fuel cell 106 is operational, e.g., has begun to receive and consume fuel. This will depend on whether pressurized hydrogen is available from tanks 114. The availability of hydrogen is automatically determined by the control system using pressure sensors in a manner known to those skilled in the art.

When hydrogen fuel is available, and the fuel cell is operational, the process moves on to a step 210. In step 210 valve 120 is automatically opened up. This causes hydrogen to travel to fuel cell 106. The fuel cell then consumes hydrogen to generate DC power and then introduce it into bus 110 to power BTS 108 in step 205.

Fuel cell 106 will continue to generate DC output in step 210 until (i) the hydrogen runs out, or (ii) AC utility 102 is restored. If AC utility 102 is restored at any time, the control system will automatically switch back to it as the primary source.

But if the AC utility is not restored, and if the hydrogen supply in tanks 114 runs out, the process will move from inquiry step 208 on to a step 212 in which the lithium batteries provide backup power. While the batteries are being drained to provide backup power to BTS 108 via bus 110, the control system will continually check to see if another source (AC utility 102 or fuel cell 106) has come back on line. If so, the system loops back to step 202 which will result in repeating the same process. If not, the process loops back to step 212 and the BTS continues to be powered by the lithium batteries.

Through these processes, the modular power system is able to outperform conventional systems in terms of reliability, efficiency, and space constraints.

Figure 3:
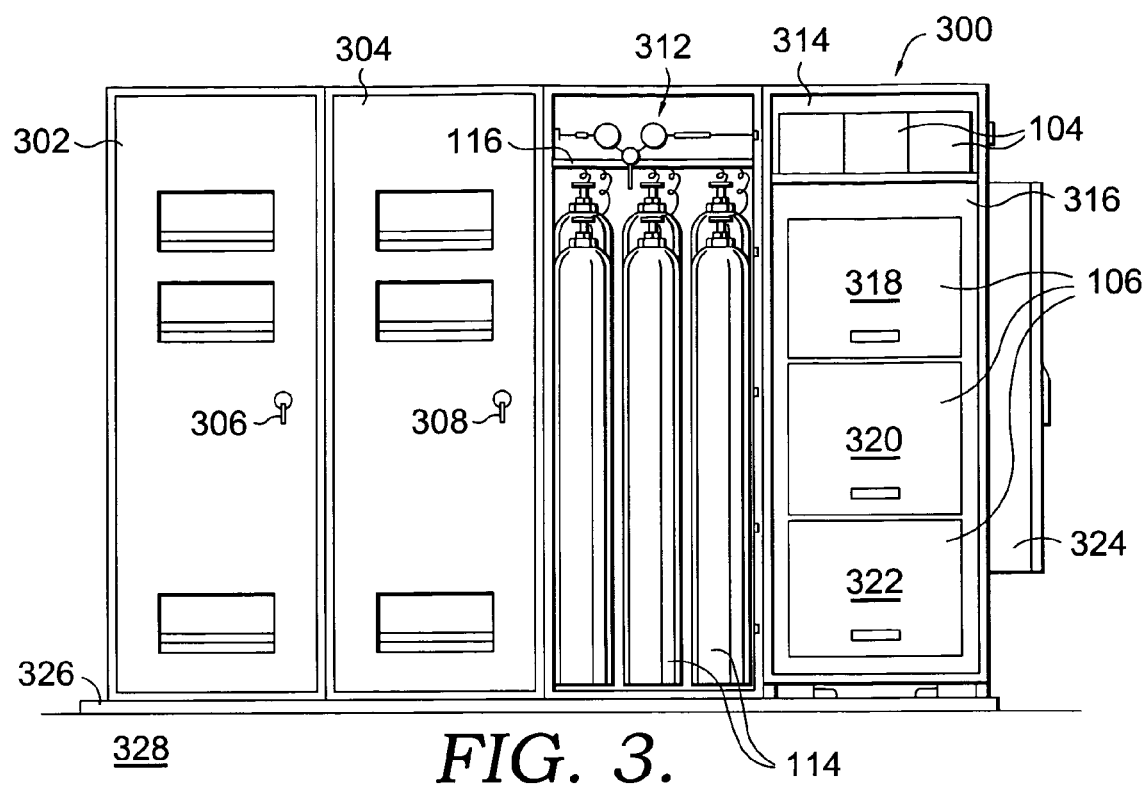
FIG. 3 is back view of the housing of the present invention.
Figure 4:
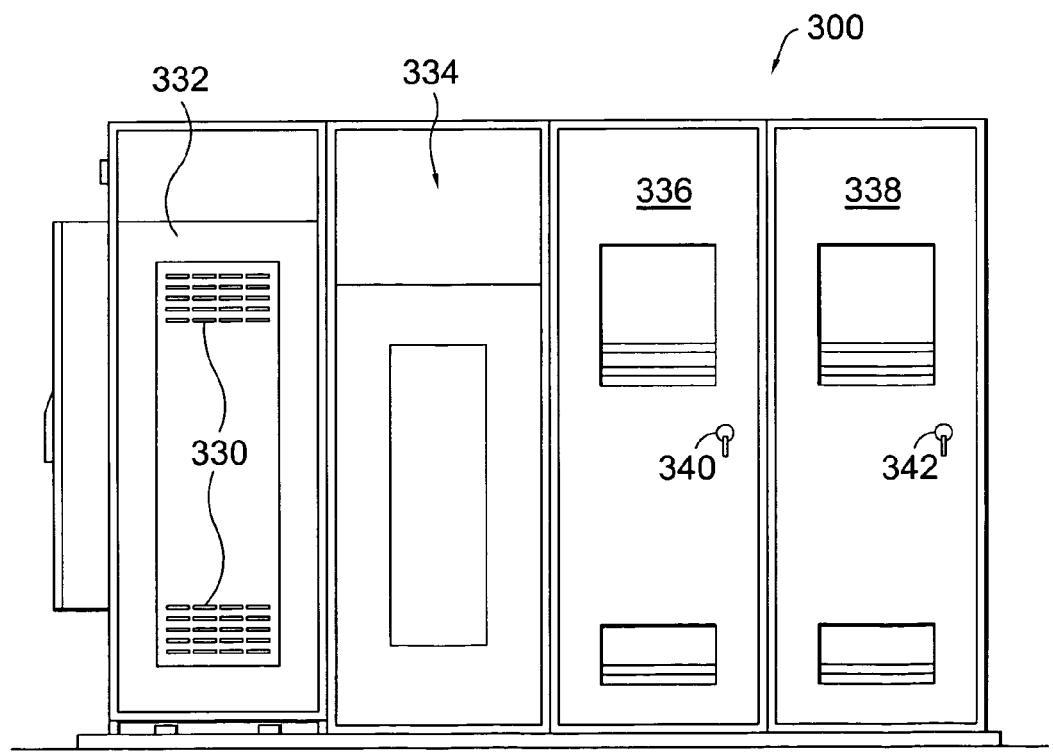
FIG. 4 is a side-view of the housing of the present invention.
Figure 5:
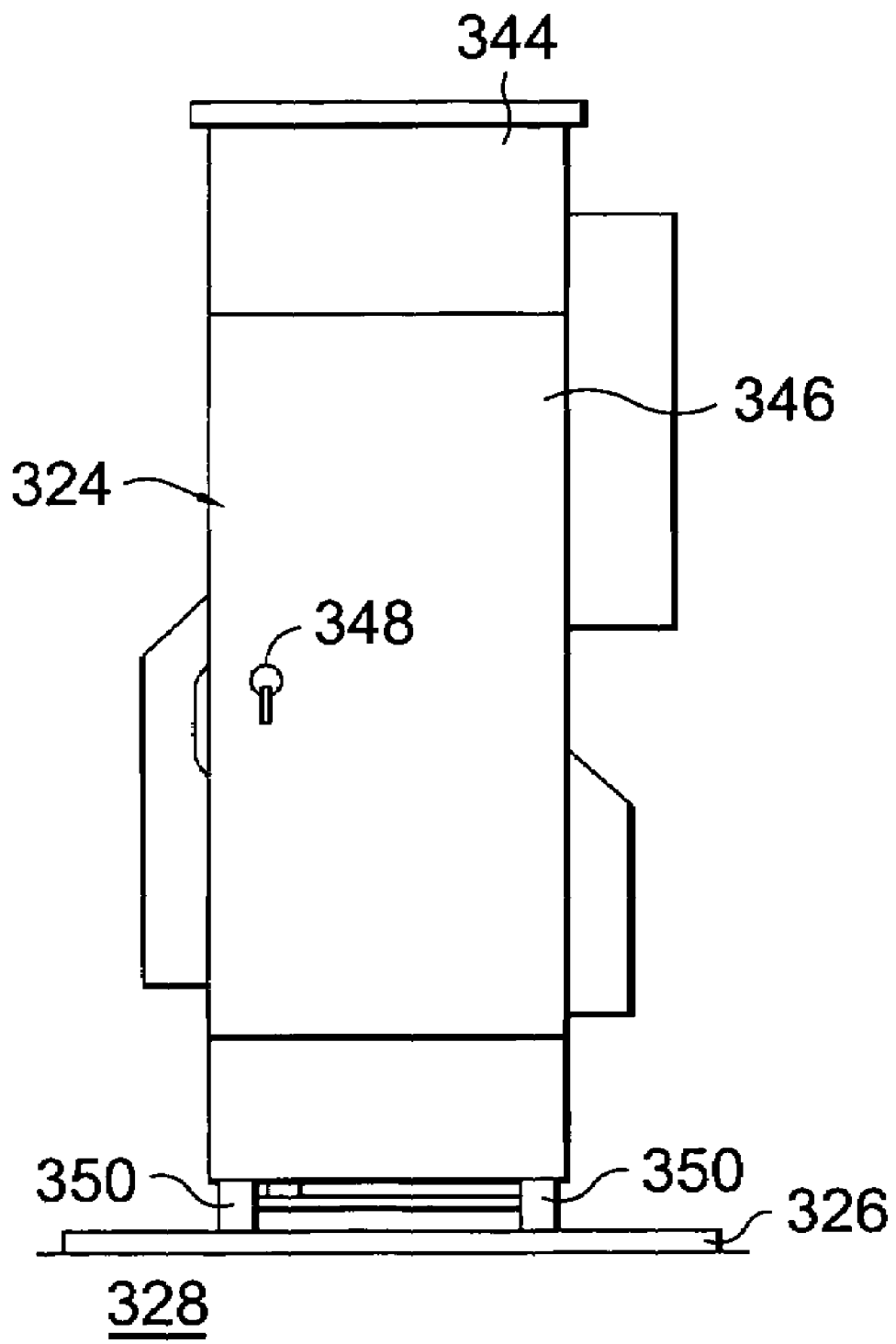
FIG. 5 is a flow chart showing the backup processes of the present invention.

Referring now to FIGS. 3-5, we see a physical embodiment of the present invention. FIG. 3 is a front view of a housing 300 which is used to house the BTS components as well as the supporting-power-system equipment. The BTS equipment is housed in an enclosure (not shown) accessible through a pair of cabinet doors 302 and 304. Each of cabinet doors 302 and 304 has handles, 306 and 308, respectively. Doors 302 and 304 make the BTS equipment accessible from the front side of the cabinet.

To the right of the BTS equipment, hydrogen tanks 114 are stored in a compartment 312. In the preferred embodiment, six tanks 114 are used, but it is important to note that the number of tanks is not critical. As can be seen, the tanks 114 are connected into manifold 116 which enables the pressure in all the tanks to be equalized.

In the next compartment over, an upper chamber 314 is designed to contain the lithium batteries 104, and a lower chamber 316 is designed to house the fuel cell 106. As can be seen in this figure, fuel cell 106 comprises three sub-modules, an upper module 318, middle module 320, and a lower module 322. At the far right end of the housing is a power protection cabinet (PPC) 324. Box 324 includes surge-protection equipment (not shown) and other electrical components (circuit breakers, relays, etc) which are all used for connectivity into the AC utility 102. The entire housing is supported on a concrete pad 326 which rests on a grade 328.

Looking now to FIG. 4, the back of the housing it can be seen that the fuel cell compartment 316 includes a couple of vents 330 in a back wall 332. Vents 330 help prevent the fuel cell from over heating. Immediately right of vented back wall 330, a back side of hydrogen tank compartment 312 is enclosed by a back wall 334. To the right of that are two doors 336 and 338 each having a handle 340 and 342 respectively. These doors give rear access to the BTS equipment which is desirable because, as one skilled in the art will recognize, features exist on both sides of the equipment.

FIG. 5 shows the right hand side of the cabinet which includes the PPC 324 which is attached to a right wall 314 of the housing. The PPC 324 has a door 346 with a latched handle 348 for access. Another thing which can be seen in FIG. 5 is that the fuel cell portion of the housing is elevated on a plurality of feet 350.

The modular aspect of the device 300 makes it easily installed. It comes equipped such that it need only be placed near an erected tower, and it is ready to go. The concrete pad 326 is preinstalled at the desired spot at the sight, and the entire module 300 is simply transported in one piece to the site, placed on the pad, connected into the existing AC source, connecting the BTS to the tower and also into at least one communications line, e.g., a T-1 line. Then it is ready to go.

One or more modules will be delivered to a particular site along with BTS equipment 108 (not shown in FIGS. 3-5), fuel cell 106, LMP batteries 104, SMRs 112, hydrogen tanks 114, and all the other supporting equipment already preassembled in cabinet 300 ready for use so that it is available to a new site upon delivery.

It will be appreciated by persons skilled in the art that the present invention is not limited to what has been particularly shown and described hereinabove. Rather, all matter shown in the accompanying drawings or described hereinabove is to be interpreted as illustrative and not limiting. Accordingly, the scope of the present invention is defined by the appended claims rather than the foregoing description.

What is claimed is:

1. A modular system for providing electrical power, said system comprising:
 a conversion device for converting power from an alternating current (AC) source into a first possible source of direct current (DC);

an energy-storage device for providing a second possible source of DC, the energy storage device acting in a temporary bridging capacity when switching from the AC source to a generating device;

the generating device adapted to noncombustively consume a gas to generate a third possible source of DC;

at least one base transceiver station (BTS) equipment that comprises radio hardware for supporting transmission and reception of data at a cellular base station, wherein the at least one BTS equipment is housed in an individual enclosure within a common housing, and wherein the at least one BTS equipment is provided with a power distribution unit that connects the at least one BTS equipment to the cellular base station that is located external to the common housing;

at least one hydrogen tank; and the common housing that accommodates a preassembly comprising the conversion device, the energy storage device, the generating device, the at least one BTS equipment, and the at least one hydrogen tank, wherein the common housing comprises the enclosure with a first set of cabinet doors and a second set of cabinet doors coupled thereto, and wherein the first set of cabinet doors provides access to a front of the at least one BTS equipment and the second set of cabinet doors provides access to a rear of the at least one BTS equipment, wherein the common housing and the accommodated preassembly are transportable in one piece to a site of the cellular base station and installable to the cellular base housing upon connecting the power distribution unit and connecting the conversion device to the AC source external to the common housing.

2. The modular system of claim 1 wherein said common housing is a cabinet that includes a plurality of chambers, each chamber is adapted to receive, and provide access to, components of the preassembly.

3. The modular system of claim 1 wherein said conversion device is a rectifier.

4. The modular system of claim 1 wherein said energy-storage device is a lithium battery that selected based on amp hour ratings sufficient to power the at least one BTS equipment, wherein the lithium battery is connected to a communication network that enables remote monitoring of a battery state of the lithium battery.

5. The modular system of claim 4 wherein said lithium battery is a lithium-metal-polymer battery.

6. The modular system of claim 1 wherein said generating device is a fuel cell.

7. The modular system of claim 6 wherein said fuel cell consumes hydrogen.

8. The modular system of claim 7 wherein said hydrogen is delivered under pressure to said fuel cell from at least one tank, wherein the fuel cell and the at least one tank are connected via tubing with an automated valve assembled thereto that controls flow of the hydrogen from the at least one tank to the fuel cell.

9. The modular system of claim 8 comprising:
a control system adapted to switch from said first source of DC to the fuel cell upon detecting said first source of DC is unavailable, wherein switching comprises:
determining whether the fuel cell is operational;
determining whether the hydrogen is available from the at least one tank;
when the fuel cell is operational and the hydrogen is available, automatically opening the automated valve causing the hydrogen to flow to the fuel cell.

10. The modular system of claim 9 wherein said second source of DC is adapted to serve as a backup source if said first and third sources are unavailable.

11. The modular system of claim 9 comprising:
the control system adapted to switch from the fuel cell to said first source of DC upon detecting said first source of DC is available, wherein switching comprises:
continually checking to determine whether the AC source has come back online;
when the AC source has been restored, automatically closing the automated valve and switching to the AC source.

12. The modular system of claim 1 wherein said housing also includes a power-protection compartment including power-protection equipment.

13. The modular system of claim 1 wherein said first, second and third possible sources of DC all feed into a common bus.

14. The modular system of claim 1 wherein the module system is installed at the site to the cellular based station by connecting the conversion device to the AC source, and connecting the BTS equipment to a tower and a communication line provided at the cellular base station.

* * * * *

UNITED STATES PATENT AND TRADEMARK OFFICE
CERTIFICATE OF CORRECTION

PATENT NO.      : 7,615,889 B2                                       Page 1 of 1
APPLICATION NO. : 11/120053
DATED           : November 10, 2009
INVENTOR(S)     : Willets et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 627 days.

Signed and Sealed this

Nineteenth Day of October, 2010

David J. Kappos
*Director of the United States Patent and Trademark Office*